July 17, 1956  F. M. POOLE  2,754,676

DENSIMETER

Filed March 17, 1954  2 Sheets-Sheet 1

Foster M. Poole,
Inventor.
Koenig and Pope,
Attorneys.

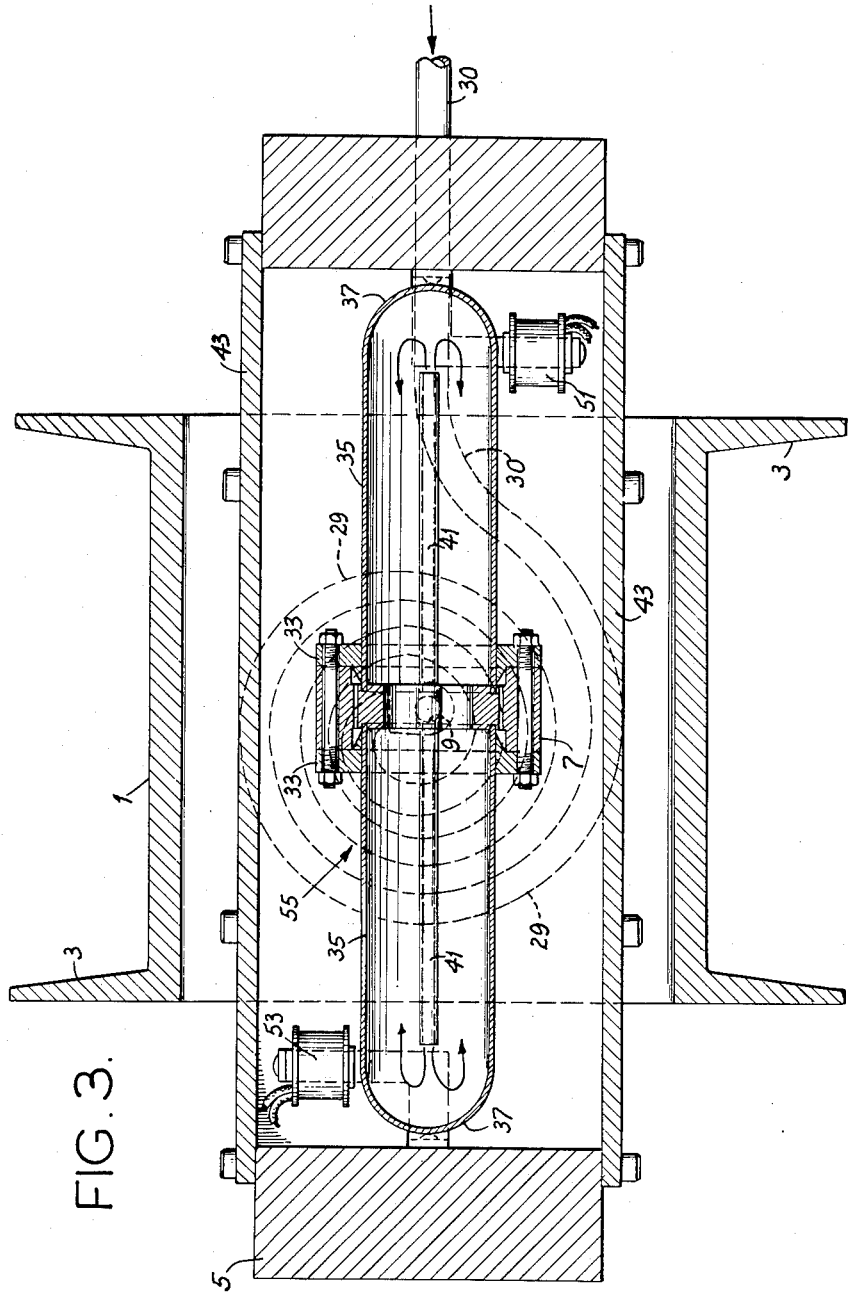

United States Patent Office 2,754,676
Patented July 17, 1956

2,754,676

DENSIMETER

Foster M. Poole, University Park, Tex., assignor of one-half to Carl Casey, Dallas, Tex.

Application March 17, 1954, Serial No. 416,894

14 Claims. (Cl. 73—32)

This invention relates to densimeters, and more particularly to a densimeter for measuring the densities of fluids. The invention is an improvement upon certain mechanical features of the construction shown in the United States Patent 2,635,462, dated April 21, 1953.

Among the several objects of the invention may be noted the provision of a dependable and reliable densimeter for more accurately and continuously indicating the densities of fluids, both liquid and gaseous; the provision of a densimeter of the class described in which density indications are independent of the pressures of the fluid under measurement; and the provision of a shockproof densimeter of this class which is guarded against surrounding vibrations. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a side elevation illustrating the invention, with parts broken away;

Fig. 3 is an enlarged horizontal section taken on line 3—3 of Fig. 1; and,

Corresponding reference characters indicate corresponding parts throughout the several views of the drawings.

Figure 1:
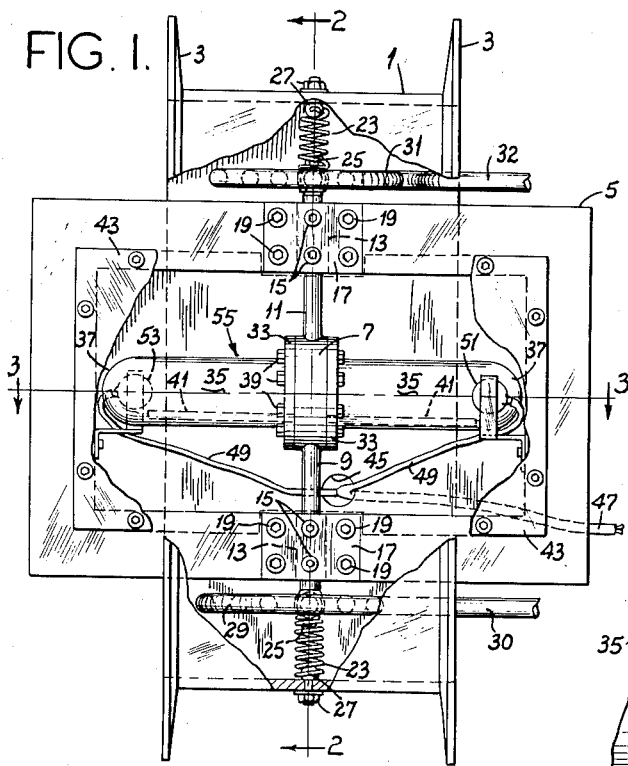
Figure 2:
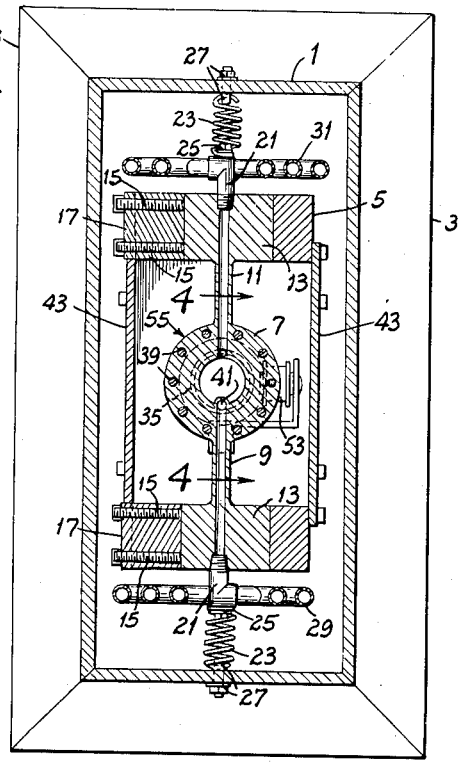
Fig. 2 is a vertical section taken on line 2—2 of Fig. 1.

In U. S. Patent 2,635,462 is shown apparatus for responding to the density of fluids, either liquid or gaseous; comprising a hollow vibratory system containing a fluid the density of which is to be determined. In that system the container for the fluid is anchored at one portion and its other portions (with the contained fluid) are caused to vibrate mechanically at a natural frequency of resonance. An electric driver causes the mechanical vibration. Electric pick-up means is responsive to the vibration of the system. This pick-up means is regenerative with respect to the electric driver so as to sustain the vibrations. It also feeds an electrical output connected with frequency-responsive means for indicating said natural frequency. Since the natural frequency of the system, including the fluid is a function of the fluid density, the frequency-responsive means is an indicator of the latter.

Inasmuch as the electrical elements shown in said patent are illustrative of those that may be used in association with the present improvements, further detailed description of them will be unnecessary.

The point of departure of the present invention relates to certain mechanical features. In the mechanical parts of the construction of said patent the vibrations of the fluid container are brought about by distorting the container shape. Such distortion is a function of the stiffness of (or restorative forces in) the container, as filled.

For no, or small, pressure variations in the contained fluid, operation by means of such distortion is satisfactory. But under substantial variations in pressure of the fluid in the container, the stiffness of the container as filled varies. That is, its restorative forces vary with this pressure. Thus under conditions of substantial pressure variations in the contained fluid, some error in density determinations are to be expected. Of course, if the pressure variations are not substantial or nonexistent, the error is nil.

The purpose of the present improvement is to provide a mechanically vibratory structure wherein substantial pressure variations in the fluid contained in or circulating through the hollow vibratory system will have negligible effect upon the natural vibratory frequency of resonance. Briefly, this is accomplished by making the stiffness of the liquid-containing vibratory portions of the system (including the contained fluid) substantially independent of internal pressure therein. That is, the container construction is arranged so that the restorative forces engendered during vibration are invariable with respect to even substantial changes in internal pressures.

Referring now more particularly to the drawings, there is shown at numeral 1 a supporting frame flanged for stiffness, as indicated at 3. Extending crosswise through the frame is a subframe 5 of substantial mass. The terms frame and subframe are used herein in the broad sense of supports, their particular rectangular forms being immaterial to the broader features of the invention. Within this subframe 5 is a circular yoke 7 from which extend integral inlet and outlet pipes 9 and 11, respectively. These pipes carry rectangular anchor blocks 13, held in the frame by set screws 15, the latter being threaded through T-shaped holding blocks 17 which are held to the frame by screws 19.

Communicating with the outer ends of inlet and outlet pipes 9 and 11 (through blocks 7) are threaded-on elbow fittings 21. Coaxial supporting tension springs are shown at 23. These are oppositely wound and tensioned. Their attachments to the elbow fittings 21 are shown at 25 and their attachments to the frame 1 are shown at 27. Springy spiral inlet and outlet pipes 29 and 31 are respectively attached to the fittings 21 for leading fluid into and out of the apparatus, the spirals of these pipes being oppositely wound and tensioned. Thus the subframe 5 and parts connected thereto have a tension spring mounting relative to the frame 1 and to inlet pipe leads 30 and 32.

Figure 4:
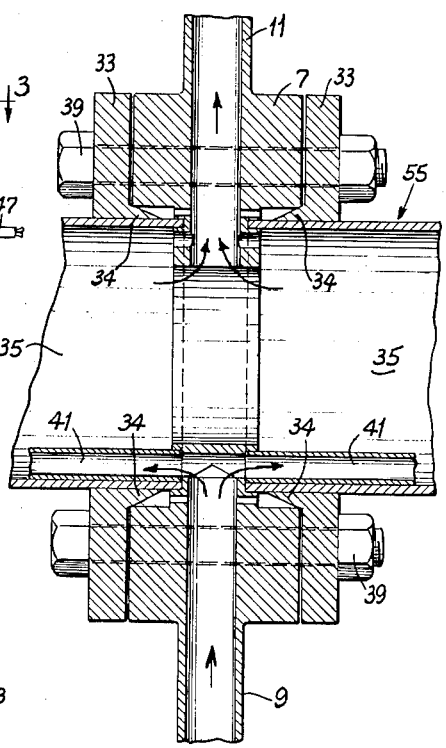
Fig. 4 is an enlarged fragmentary detail section taken on line 4—4 of Fig. 2.

Attached to the yoke 7 by means of wedging clamp rings 33 are oppositely extending rigid cups or tubes 35, having hemispherical end enclosures 37. Their wedge portions are shown at 34, bearing on the inner edges of yoke 7 and on the cups 35. The rings 33 are held to the yoke 7 by tension bolts 39. Lead-in pipes 41 are welded to the bottoms of the tubes 35 for receiving fluid from the inlet pipe 9 (via yoke 7) and distributing it to the opposite ends of the tubes 35. From these points the fluid may return and escape through the outlet pipe 11 (note the darts in Fig. 4).

Protective cover plates 43 are bolted to the sides of the subframe 5. One of these includes an opening 45 for leading in an electric cable 47, having interior branches 49. One of these branches leads to an electromagnetic vibrating driver 51, mounted on and within the frame 5 adjacent the outer end of one of the tubes 35. The other branch 49 leads to an electromagnetic pick-up device 53, mounted on and within the frame 5 adjacent the outer end of one of the pipes 35. It will be understood that at least the portions of the cups 35 adjacent the devices 51 and 53 are ferromagnetic.

The subframe 5 constitutes a spring-mounted inertia frame within the rigid frame 1. Its mass is many times greater than the mass of what will hereinafter be referred to as the fluid-containing capsule 55, constituted by the rigidly related parts 7, 33, 35 and 41. The mass ratio of subframe 5 with respect to the fluid-containing capsule 55 (including its fluid) is on the order of 100:1.

The inlet and outlet pipes 9 and 11 are sufficiently slender so that, by means of such torque as may be applied by the driver 51 to the capsule 55 (around the common axes of pipes 9 and 11), these pipes will twist or deflect torsionally while at the same time producing a restorative torque. Thus by applying an A. C. frequency to the vibrating driver 51, the nondeformable capsule 55 may be vibrated in a plane normal to the axes of pipes 9 and 11, producing torsional twists in said shafts with torsional restorative forces therein. The capsule 55 will assume a natural vibratory frequency of resonance, while the relatively heavy inertia frame will tend to maintain a mean position by reason of its inertia. The natural vibratory frequency of resonance produces a signal in the electric pick-up means 53 which is transmitted to suitable frequency-responsive indicating means, as set forth in said patent. Since the parts constituting the capsule 55 are of constant mass, indications will change only in response to change of mass of the fluid in the capsule, such change of mass being a function of the fluid density. Hence the indicating means will produce readings which are a function of the density of the contained fluid; provided suitable temperature corrections are made, as set forth in the patent.

It will be apparent that the restorative forces (i. e., torsional stresses in pipes 9 and 11) are negligibly affected by the internal fluid pressure in the system. Moreover, the appropriately rigid capsule 55 is substantially nondeformable under vibration. Therefore, change in pressure of the contained fluid will not change the natural vibratory frequency of resonance of the capsule and its contained fluid.

From the above it will be seen that the present improvement is effected by so constructing and mounting the container carrying the fluid (the density of which is to be measured) that all restorative forces that come into play upon vibrating the container and contained fluid at natural frequency of resonance are unaffected by the fluid pressure. Thus the container 55 is rigid; the restorative forces are engendered in the resilient mounting means 9 and 11 by the torsional stresses caused by twisting the mounting means; and these restorative forces are unaffected by the internal pressure of the fluid.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for responding to the density of fluids substantially independently of their pressures, comprising a frame, an elongate hollow substantially rigid fluid container, coaxial inlet and outlet pipes for circulating fluid through the container, and means anchoring said inlet and outlet pipes to the frame, said container and contained fluid having a natural vibratory frequency of resonance, said inlet and outlet pipes being adapted to perform torsional movements in response to vibratory movements of said rigid container, means for vibrating the container, and means for measuring the frequency of vibration as an indication of density of the contained fluid.

2. Apparatus according to claim 1, including spring means for mounting said first-mentioned frame, and an additional frame supporting said spring means so as resiliently to suspend said first-mentioned frame.

3. Apparatus for responding to the density of fluids substantially independently of their pressures, comprising a frame, an elongate hollow rigid capsule having an axis, inlet and outlet pipes having a common axis and adapted to circulate fluid through the container, the axis of the pipes and of the container being perpendicular, means anchoring said inlet and outlet pipes to the frame, said container having a natural vibratory frequency of resonance in a plane normal to the pipe axis, said pipes being adapted to perform torsional movements in response to vibratory movements of said container, means for vibrating the container, and means for measuring the frequency of vibration as an indication of density of the contained fluid.

4. Apparatus according to claim 3, wherein the pipes connect to the capsule substantially centrally between its ends, and baffle means in the capsule on opposite sides of the pipe connections adapted to enforce flow of fluid from one pipe to both ends of the capsule and return flow from both ends to the other pipe.

5. Apparatus for responding to the density of fluids substantially independently of their pressures, comprising a hollow yoke having inlet and outlet pipes disposed on an axis, an inertial frame rigidly attached to said pipes, an elongate rigid container supported midway by said yoke and extending perpendicular to the pipe axis, means for circulating fluid through the pipes and container, said pipes being sufficiently small between the rigid container and the inertial frame to respond with torsional deflections and restoring stresses therein to vibrations of the rigid container, said vibrations being in a plane perpendicular to said axis, said vibrations being at the natural vibratory frequency of resonance of said rigid container and its contained fluid, means for vibrating the container and yoke, and means for measuring the frequency of vibration as an indication of density of the contained fluid.

6. Apparatus for responding to the density of fluids substantially independently of their pressures, comprising a rigid main frame, a hollow yoke having vertical coaxially disposed inlet and outlet pipes, spring means mounting said pipes upon said main frame, resilient inlet and outlet means for circulating fluid to and from said yoke by way of said pipes, an inertial frame rigidly attached to said pipes, rigid container means extending from said yoke to provide therewith a rigid container for fluid, said pipes being sufficiently small between the rigid container means and the inertial frame to respond with torsional deflections and restoring stresses therein to vibrations of the rigid container means at the natural vibratory frequency of resonance of said rigid container means and its contained fluid, means for vibrating the container means and yoke, and means for measuring the frequency of vibration as an indication of density of the contained fluid.

7. Apparatus for responding to the density of fluids substantially independently of their pressures, comprising a rigid main frame, a yoke having vertical coaxially disposed inlet and outlet pipes, spring means mounting said pipes upon said main frame, resilient inlet and outlet means for circulating fluid to and from said yoke by way of said pipes, an inertial frame rigidly attached to said pipes, rigid container means extending laterally from said yoke to provide therewith a rigid capsule for fluid, means for circulating fluid from the inlet pipe to the ends of said capsule and thence to the outlet pipe, said pipes being sufficiently small between the capsule and their points of attachment with the inertial frame so as to respond with torsional deflections and restoring stresses to vibrations of the rigid capsule, said vibrations being in a horizontal plane and at the natural vibratory frequency of resonance of said rigid capsule and its contained fluid, means for vibrating the container means, and means for measuring the frequency of vibration as an indication of the density of the contained fluid.

8. Apparatus for indicating the density of a fluid substantially independently of its internal pressure, comprising a substantially rigid container shaped as an elongate capsule and adapted to be filled with said fluid, means for resiliently mounting said container constituted by at least one cylinder having a transverse attachment to a central portion of said container, and means for vibrating said container on said resilient mounting means at a natural vibratory frequency of resonance, whereby restorative forces are engendered substantially only in the resilient mounting means, and means for measuring the frequency of vibration of said container as an indication of density of its contained fluid.

9. Apparatus made according to claim 8, wherein in response to said vibrating means the container has vibratory movement in a plane transverse to the axis of said cylinder.

10. Apparatus made according to claim 9, wherein said cylinder constitutes a fluid pipe for circulation of fluid relative to said capsule.

11. Apparatus for indicating the density of a fluid substantially independently of its internal pressure, comprising a substantially rigid container adapted to be filled with said fluid, means for resiliently mounting said container, a movable inertial frame forming a rigid support for at least one portion of said resilient means, said frame having a substantially greater mass than that of said container including any contained fluid, and means for vibrating said container on said resilient mounting means at a natural vibratory frequency of resonance, whereby restorative forces are engendered substantially in the resilient mounting means, and means for measuring the frequency of vibration of said container as an indication of density of its contained fluid.

12. Apparatus made according to claim 11, including a rigid supporting frame, and spring mounting means between said supporting frame and said inertial frame.

13. Apparatus for indicating the density of fluids substantially independently of their pressures, comprising a hollow container for a fluid the density of which is to be determined, said container being substantially nondeformable under vibration, a resilient support for said container comprising at least one torsional hollow support for circulating fluid through the container and permitting movement of it and the contained fluid at a natural vibratory frequency of resonance, means for vibrating as a unit, said container including the contained fluid at said natural frequency, and means for measuring the frequency of vibration of said container as an indication of its contained fluid.

14. Apparatus for responding to the density of fluids substantially independently of their pressures, comprising a rigid supporting frame, and inertial frame, an elongate horizontally extending rigid container providing a rigid compartment for circulating fluid, a first pair of vertically disposed coaxial inlet and outlet pipes rigidly attached to mid points of the container and rigidly attached to said inertial frame, said container extending substantially symmetrically from the axis of said first pair of pipes, coil spring means supporting the inertial frame from the rigid frame, said spring means being coaxially disposed with respect to said first pair of pipes, a second pair of oppositely coiled inlet and outlet pipes respectively connected with said first pair of inlet and outlet pipes, any torque applied to the inertial frame by coiling and uncoiling of said second pair of pipes due to pressure changes therein being substantially compensated, means on the inertial frame for vibrating the container in a horizontal plane, said first pair of pipes supplying restorative forces by torsion only, and means for measuring the frequency of vibration as an indication of the density of the contained fluid.

References Cited in the file of this patent
UNITED STATES PATENTS

| | | |
|---|---|---|
| 2,321,175 | Binckley | June 8, 1943 |
| 2,635,462 | Poole et al. | Apr. 21, 1953 |